(12) United States Patent
Sai

(10) Patent No.: US 11,426,947 B2
(45) Date of Patent: Aug. 30, 2022

(54) METHOD FOR MANUFACTURING METAL-RESIN JOINT

(71) Applicant: Mutsuki Electric Co., Ltd., Osaka (JP)

(72) Inventor: Seiichi Sai, Osaka (JP)

(73) Assignee: MUTSUKI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 17/434,609

(22) PCT Filed: Mar. 6, 2020

(86) PCT No.: PCT/JP2020/009716
§ 371 (c)(1),
(2) Date: Aug. 27, 2021

(87) PCT Pub. No.: WO2020/184440
PCT Pub. Date: Sep. 17, 2020

(65) Prior Publication Data
US 2022/0168965 A1  Jun. 2, 2022

(30) Foreign Application Priority Data

Mar. 8, 2019  (JP) ............................. JP2019-061811
Jul. 2, 2019   (WO) .................. PCT/JP2019/026368

(51) Int. Cl.
*B29C 65/10* (2006.01)
*B29C 65/36* (2006.01)
*B29C 65/00* (2006.01)

(52) U.S. Cl.
CPC .......... *B29C 65/10* (2013.01); *B29C 65/3676* (2013.01); *B29C 66/1122* (2013.01);
(Continued)

(58) Field of Classification Search
CPC . B29C 65/10; B29C 65/3676; B29C 66/1122; B29C 66/7422; B29C 66/74281; B29C 66/74283
See application file for complete search history.

(56) References Cited

U.S. PATENT DOCUMENTS

2009/0252978 A1*  10/2009  Katayama ............. B29C 66/742
                                                              156/272.8
2011/0139353 A1*  6/2011  Sugiyama ......... B29C 66/02245
                                                              156/212
2014/0064830 A1   3/2014  Nagano et al.

FOREIGN PATENT DOCUMENTS

JP    2010-46831 A    3/2010
JP    2011-168036 A   9/2011
(Continued)

OTHER PUBLICATIONS

International Search Report dated May 26, 2020, issued in counterpart International Application No. PCT/JP2020/009716 (2 pages).

*Primary Examiner* — Daniel McNally
(74) *Attorney, Agent, or Firm* — WHDA, LLP

(57) ABSTRACT

A method for manufacturing a metal-resin joint 30 according to the present disclosure is a method for manufacturing the metal-resin joint 30 in which a synthetic resin member 10 made of thermoplastic resin and a metal member 20 made of metal are bonded to each other, the method including: a first process of exposing a surface 12 of the synthetic resin member 10 molded into a predetermined shape, to air heated to a first temperature T1 equal to or higher than a deflection temperature under load Tf of the thermoplastic resin when a load of 1.8 MPa is applied; and a second process of bonding the surface 12 of the synthetic resin member 10 and a surface 22 of the metal member 20 to each other. Accordingly, it is possible to improve the bonding strength between the metal member 20 and the synthetic resin member 10.

9 Claims, 2 Drawing Sheets

(52) U.S. Cl.
CPC .... *B29C 66/7422* (2013.01); *B29C 66/74281* (2013.01); *B29C 66/74283* (2013.01)

(56) References Cited

FOREIGN PATENT DOCUMENTS

| | | |
|---|---|---|
| JP | 2012-170975 A | 9/2012 |
| JP | 2018-8409 A | 1/2018 |
| WO | 2014/157289 A1 | 10/2014 |
| WO | 2019/026331 A1 | 2/2019 |

\* cited by examiner

[FIG. 1]
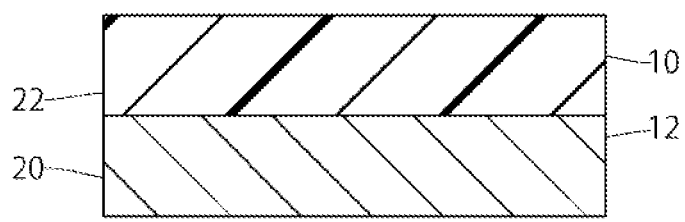
[FIG. 2]
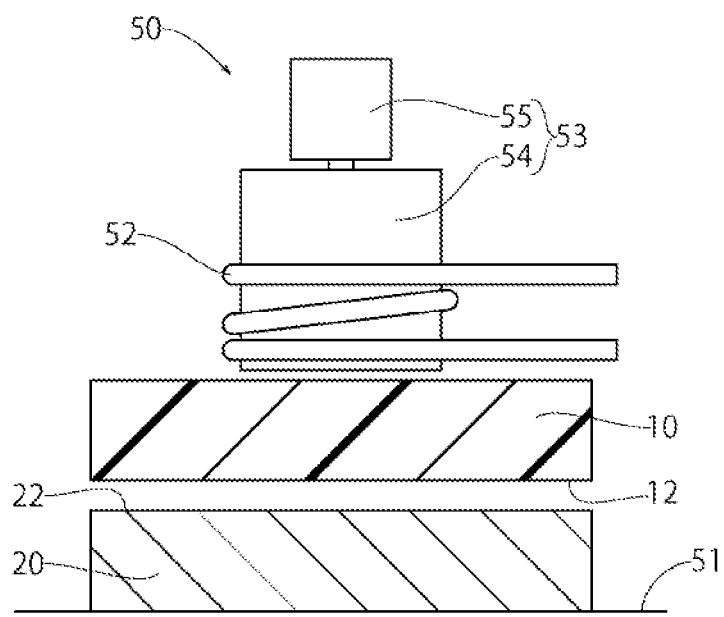

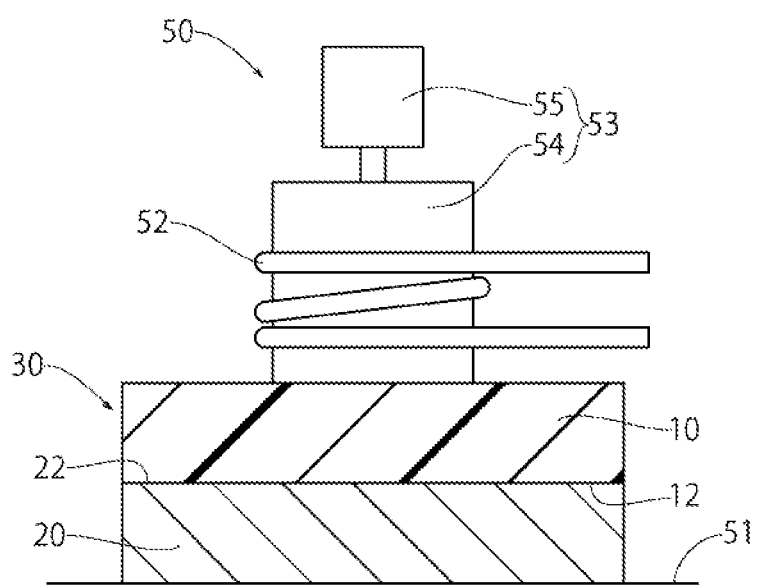
[FIG. 3]

METHOD FOR MANUFACTURING METAL-RESIN JOINT

TECHNICAL FIELD

The present disclosure relates to a method for manufacturing a metal-resin joint.

BACKGROUND ART

Various methods have been suggested as a method for manufacturing a metal-resin joint by bonding a metal member made of metal and a synthetic resin member made of synthetic resin to each other (for example, refer to Patent Literatures 1 and 2 described below).

It has been suggested to increase a bonding strength of the metal member to the synthetic resin member by forming uneven anchors on the surface of the metal member by laser or chemical etching. In a method of providing the metal with uneven anchors, the bonding point is likely to be destructed due to the difference in linear expansion coefficients between the resin and metal when thermal shock testing is conducted. Intricate anchor holes are necessary to obtain firm bonding, but in addition to the difficulty in forming such anchor holes, it is difficult to completely fill the anchor holes with resin, and it is difficult to obtain stable bonding strength.

In a case of bonding the metal member and the synthetic resin member to each other by intermolecular forces due to the dipolar interaction of the metal and resin, such as friction welding, it is difficult to directly bond a resin having a small dipolar interaction, such as an olefin resin (for example, polypropylene resin (PP resin)), to a metal. By adding a compound having high dipolar interaction, such as a carboxylic anhydride, to a resin having low dipolar interaction, it is possible to increase the bonding strength, but there is a case where physical properties such as strength of the synthetic resin member itself are reduced.

CITATION LIST

Patent Literature

PTL 1: Japanese Unexamined Patent Publication JP-A 2018-8409
PTL 2: Japanese Unexamined Patent Publication JP-A 2012-170975

SUMMARY OF INVENTION

Technical Problem

The present disclosure is made in consideration of the above-described points, and an object of the present disclosure is to provide a method for manufacturing a metal-resin joint that can improve the bonding strength between a metal member made of metal and a synthetic resin member made of thermoplastic resin material.

Solution to Problem

According to the present embodiment, the following aspects [1] to [10] are provided.

[1] A method for manufacturing a metal-resin joint in which a synthetic resin member made of thermoplastic resin and a metal member made of metal are bonded to each other, the method including: a first process of exposing a surface of the synthetic resin member molded into a predetermined shape, to a gas heated to a first temperature equal to or higher than a deflection temperature under load of the thermoplastic resin when a load of 1.8 MPa is applied; and a second process of bonding the surface of the synthetic resin member and a surface of the metal member to each other.

[2] The method for manufacturing a metal-resin joint according to [1], in which, in the second process, the surface of the synthetic resin member and the surface of the metal member are bonded to each other at a second temperature lower than the first temperature.

[3] The method for manufacturing a metal-resin joint according to [1] or [2], in which the second temperature is a temperature lower than a melting point of the thermoplastic resin.

[4] The method for manufacturing a metal-resin joint according to any one of [1] to [3], in which, in the first process, by heating the metal member in a state where the metal member and the synthetic resin member are disposed to face each other with a gap in the gas, the gas between the metal member and the synthetic resin member is heated to the first temperature by heat of the metal member.

[5] The method for manufacturing a metal-resin joint according to [4], in which, in the first process, the metal member is heated by induction heating.

[6] The method for manufacturing a metal-resin joint according to any one of [1] to [5], in which, in the second process, while heating the surface of the synthetic resin member and the surface of the metal member at the second temperature lower than the first temperature, one of the metal member and the synthetic resin member is pressed against the other one at a pressure which is equal to or higher than a compressive yield stress of the thermoplastic resin, and the metal member and the synthetic resin member are bonded to each other.

[7] The method for manufacturing a metal-resin joint according to any one of [1] to [6], in which, in the first process, the gas exposed to the surface of the synthetic resin member is an oxygen-containing gas.

[8] The method for manufacturing a metal-resin joint according to any one of [1] to [7], further includes: a third process of forming an oxide film on the surface of the metal member, in which, in the second process, the oxide film is disposed between the metal member and the synthetic resin member, and the metal member and the synthetic resin member are bonded to each other.

[9] The method for manufacturing a metal-resin joint according to [8], in which, in a third process, a rising temperature per one minute when heating the surface of the metal member is equal to or higher than a melting point temperature of the metal.

[10] The method for manufacturing a metal-resin joint according to any one of [1] to [9], further including: a fourth process of roughening the surface of the metal member, in which, in the second process, the roughened surface of the metal member and the synthetic resin member are bonded to each other.

Advantageous Effects of Invention

In the present disclosure, a metal-resin joint having high bonding strength between a metal member and a synthetic resin member can be obtained.

BRIEF DESCRIPTION OF DRAWINGS

FIG. 1 is a sectional view of a metal-resin joint manufactured by a method for manufacturing a metal-resin joint according to an embodiment of the present disclosure.

FIG. 2 is a view illustrating a first process of the method for manufacturing a metal-resin joint according to the embodiment of the present disclosure.

FIG. 3 is a view illustrating a second process of the method for manufacturing a metal-resin joint according to the embodiment of the present disclosure.

DESCRIPTION OF EMBODIMENTS

Hereinafter, embodiments of the present disclosure will be described with reference to the drawings. The present disclosure is not limited to the following embodiments. The following embodiments are presented as examples and are not intended to limit the scope of the invention. The new embodiments can be implemented in various other forms, and various omissions, substitutions, and changes can be made without departing from the gist of the invention.

(1) Metal-Resin Joint 30

First, a metal-resin joint 30 manufactured by a manufacturing method of the present embodiment will be described. As illustrated in FIG. 1, the metal-resin joint 30 includes a synthetic resin member 10 made of thermoplastic resin and a metal member 20 made of metal, and a surface (hereinafter, there is a case where the surface is referred to as "resin bonding surface") 12 of the synthetic resin member 10 and a surface (hereinafter, there is a case where the surface is referred to as "metal bonding surface") 22 of the metal member 20 are bonded to each other.

(2) Synthetic Resin Member 10

The synthetic resin member 10 is a member made by molding the thermoplastic resin into a predetermined shape, such as a block, plate, or wire shape. The synthetic resin member 10 may be a coating film of thermoplastic resin or an adhesive layer made of thermoplastic resin adhesive. Specific examples of the thermoplastic resin that makes the synthetic resin member 10 include polypropylene resin (PP resin), polyacetal resin (POM resin), polyphenylene sulfide resin (PPS resin), polyetheretherketone resin (PEEK), acrylonitrile/butadiene/styrene resin (ABS resin), polyethylene resin (PE resin), polybutylene terephthalate resin (PBT resin), polyamide resin (PA resin) such as nylon 66 (PA66), epoxy resin, liquid crystal polymer (LCP resin), modified polyphenylene ether resin (modified PPE), and reactor type soft polypropylene resin (metallocene reactor type TPO resin). The synthetic resin member 10 may be made of a carbon fiber reinforced thermoplastic resin (CFRTP), in which carbon fibers are blended into the thermoplastic resin as described above, or a resin, in which a reinforcing material such as glass fiber or talc, flame retardants, degradation inhibitors, and elastomer components are blended into the above-described thermoplastic resin.

(3) Metal Member 20

The metal member 20 is a member obtained by molding the metal into a predetermined shape, such as a block, plate, or wire shape. A metal that makes the metal member 20 is not particularly limited, and various types of metals can be used. For example, copper (Cu), iron (Fe), aluminum (Al), titanium (Ti), nickel (Ni), chromium (Cr), and the like can be used as the metal that makes the metal member 20. The metal member 20 may be made of an alloy consisting of two or more metals, such as copper alloy, iron alloy (steel material), aluminum alloy, stainless steel, titanium alloy, nickel alloy, and chromium alloy.

The shape of the metal member 20 can be any desired shape depending on the application or the like. As the method for molding the metal member 20, any method can be applied, and casting by pouring molten metal into a mold having a desired shape, cutting using a machine tool or the like, punching using a press machine or the like, and the like may be used.

The metal member 20 may also have an oxide film (metal oxide) formed on the metal bonding surface 22. The oxide film may be a natural oxide film which is naturally formed on the surface of metal. The oxide film may be formed on the surface of the metal member 20 by surface treatment with an oxidant, electrolytic treatment with anodic oxidation, plasma oxidation treatment, or heat oxidation treatment in the oxygen-containing gas, and the like.

As a preferable aspect, the oxide film may be formed on the surface of the metal member 20 by rapidly heating the surface of the metal member 20 under an atmosphere of the oxygen-containing gas, such as in the air. It is preferable that the rising temperature of the surface of the metal member 20 per minute during rapid heating is equal to or higher than the melting point temperature of the metal that makes the metal member 20. By rapidly heating the surface of the metal member 20 in this manner, a dense oxide film can be formed on the surface of the metal member 20. Furthermore, by rapidly heating the surface of the metal member 20, microcracks are generated on the surface of the oxide film, and a bonding area with the synthetic resin member 10 becomes larger.

Although the surface of the metal member 20 can be heated rapidly by various methods such as laser heating, induction heating, or resistor heating, the temperature raising speed at the time of heating is fast and the temperature control is easy, and thus, it is preferable to heat the surface of the metal member 20 by irradiating a laser beam to form the oxide film.

The metal member 20 may perform roughening treatment of providing an uneven shape on the metal bonding surface 22. Various methods can be employed for the roughening treatment. For example, the metal bonding surface 22 may be roughened by irradiation of laser beam, chemical etching, or pressing.

As a preferable aspect, under an atmosphere of the oxygen-containing gas, by rapidly heating the surface of the metal member 20 to form the oxide film on the surface of the metal member 20, and by generating microcracks on the surface of the oxide film, the metal bonding surface 22 may be roughened.

(4) Method for Manufacturing Metal-Resin Joint 30

The metal-resin joint 30 is obtained by performing a first process and a second process with respect to the synthetic resin member 10 described in (2) above and the metal member 20 described in (3) above. In the present embodiment, the first process and the second process are performed using a bonding device 50 as illustrated in FIGS. 2 and 3 to manufacture the metal-resin joint 30.

The bonding device 50 includes: a stage 51 on which the metal member 20 is placed; a heating device 52 that inductively heats the metal member 20 placed on the stage 51; and a pressing device 53 that pressurizes and bonds the synthetic resin member 10 to the metal member 20.

The heating device 52 includes an induction heating coil connected to a power source device (not illustrated), and when a drive power source is input from the power source device, a magnetic field is generated from the induction heating coil to inductively heat the metal bonding surface 22 of the metal member 20 placed on the stage 51.

The pressing device 53 includes: a rod 54 formed of insulator such as ceramics; and a pressurizing unit 55 that moves the rod 54 to press the synthetic resin member 10 against the metal member 20. The rod 54 may be inserted into a hollow part of the induction heating coil of the heating device 52 and disposed to face the synthetic resin member 10, as illustrated in FIG. 2. The pressurizing unit 55 includes a pneumatic cylinder controlled by an electro-pneumatic regulator, a spring type pressurizer, or the like, and can control the speed at which the synthetic resin member 10 is moved together with the rod 54 and the pressure at which the synthetic resin member 10 is pressed against the metal member 20.

In order to manufacture the metal-resin joint 30 using the bonding device 50, first, the metal member 20 is placed on the stage 51 such that the metal bonding surface 22 faces the synthetic resin member 10 to be set after this in an atmosphere where gas is present. In a case where an oxide film is formed on the surface of the metal member 20 by heat oxidation treatment or the like, or in a case where the surface of the metal member 20 is roughened by roughening treatment, the metal member 20 is disposed such that the formed oxide film or roughened surface faces the synthetic resin member 10 to be set after this.

Next, the synthetic resin member 10 is disposed such that the resin bonding surface 12 faces the metal bonding surface 22 of the metal member 20 placed on the stage 51 with a gap therebetween. The distance between the metal bonding surface 22 of the metal member 20 and the resin bonding surface 12 of the synthetic resin member 10 is set at 0.001 mm to 10 mm, for example.

Next, the heating device 52 is disposed to face the metal bonding surface 22 of the metal member 20 across the synthetic resin member 10. In a case illustrated in FIG. 2, the heating device 52 is disposed above the synthetic resin member 10, and the synthetic resin member 10 is disposed between the heating device 52 and the metal member 20.

Next, the first process of exposing the resin bonding surface 12 of the synthetic resin member 10 to a gas heated to a first temperature T1 is executed.

Specifically, the drive power source is supplied to the heating device 52 to generate a magnetic field from the induction heating coil provided in the heating device 52 and heat the metal bonding surface 22 of the metal member 20. At this time, the drive power source supplied to the heating device 52, the position of the induction heating coil provided in the heating device 52, or the like are adjusted such that the metal bonding surface 22 of the metal member 20 reaches the first temperature T1. As the metal member 20 is heated as described above, the gas between the metal member 20 and the synthetic resin member 10 is heated to the first temperature T1. Accordingly, the resin bonding surface 12 of the synthetic resin member 10 facing the metal bonding surface 22 of the metal member 20 is exposed to the gas heated to the first temperature T1, and the resin bonding surface 12 of the synthetic resin member 10 reaches the first temperature T1. The heating device 52 heats the metal bonding surface 22 of the metal member 20 for a predetermined time S1 (for example, 1 to 10 seconds) to execute the first process as described above, and then completes the first process and moves to the second process.

When the first process is completed, in order to continue executing the second process, the heating device 52 stops heating or reduces the amount of heating of the metal member 20 such that the temperature of the resin bonding surface 12, the metal bonding surface 22, and the surrounding thereof (the gas between the metal member 20 and the synthetic resin member 10) is lowered (cooled) until reaching a second temperature T2. The synthetic resin member 10 and the metal member 20 are bonded to each other at the second temperature T2.

In other words, in the second process, at a temperature (second temperature T2) lower than the first temperature T1, the pressing device 53 moves the synthetic resin member 10 at a predetermined speed V to make the synthetic resin member 10 collide with the metal member 20. At this time, the synthetic resin member 10 is pressed strongly against the metal member 20 at the position corresponding to a distal end of the rod 54, and is pressed against the metal member 20 at a predetermined pressure P for a predetermined time 82. Accordingly, the metal-resin joint 30 is obtained in which the resin bonding surface 12 of the synthetic resin member 10 and the metal bonding surface 22 of the metal member 20 are locally (spot-like) bonded to each other. Then, the second process is completed.

The first temperature T1 is a temperature which is equal to or higher than a deflection temperature under load Tf of the thermoplastic resin that makes the synthetic resin member 10 when a load of 1.8 MPa is applied. In a case where the synthetic resin member 10 is made of a resin in which a reinforcing material, such as carbon fiber, glass fiber, or talc, is blended into the thermoplastic resin, the deflection temperature under load Tf of the thermoplastic resin that makes the synthetic resin member 10 when a load of 1.8 MPa is applied is the deflection temperature under load Tf of the thermoplastic resin that does not contain the reinforcing material when a load of 1.8 MPa is applied.

An upper limit value of the first temperature T1 can be a temperature which is equal to or lower than a decomposition temperature of the thermoplastic resin that makes the synthetic resin member 10, that is, can be a temperature which is lower than a temperature at which the thermoplastic resin begins to vaporize. As an example, the upper limit value of the first temperature T1 may be 1000° C. Preferably, the upper limit value of the first temperature T1 can be set to a temperature which is 20° C. higher than a melting point Tm of the thermoplastic resin that makes the synthetic resin member 10.

The second temperature T2 may be a temperature lower than the first temperature T1, but is preferably equal to or higher than the deflection temperature under load Tf of the thermoplastic resin that makes the synthetic resin member 10 when a load of 1.8 MPa is applied. The second temperature T2 is preferably lower than the melting point Tm of the thermoplastic resin that makes the synthetic resin member 10. The temperature difference between the first temperature T1 and the second temperature T2 is preferably 1° C. or higher and 20° C. or lower.

In the present specification, the melting point Tm of the thermoplastic resin is a value measured at a temperature raising speed of 1.0° C. per minute using a differential scanning calorimeter according to JIS K7121. The melting points of typical thermoplastic resins are 168° C. for polypropylene resin, 265° C. for nylon 66, 232 to 267° C. for polybutylene terephthalate resin, and 280° C. for polyphenylene sulfide resin.

The deflection temperature under load Tf of the thermoplastic resin is a deflection temperature under load measured by a method according to JIS K7191 when a load of 1.8 MPa is applied. The deflection temperatures under load Tf of typical thermoplastic resins when a load of 1.8 MP is applied are 57 to 65° C. for polypropylene resin, 66 to 68° C. for nylon 66, 58° C. for polybutylene terephthalate resin, and 105° C. for polyphenylene sulfide resin.

The first process is preferably executed in the oxygen-containing gas such as air. In other words, it is preferable to heat the metal bonding surface 22 and the resin bonding surface 12 to the first temperature T1 in an atmosphere of oxygen-containing gas, and expose the metal bonding surface 22 and the resin bonding surface 12 to the oxygen-containing gas heated to the first temperature T1.

When the first process is executed in an atmosphere of the oxygen-containing gas, the resin bonding surface 12 of the synthetic resin member 10 reacts with the oxygen contained in the oxygen-containing gas to generate functional groups that can be chemically bound by neutralization reactions with basic or amphoteric oxides, on the resin bonding surface 12 of the synthetic resin member 10.

In general, the surface of the metal member 20 is oxidized and coated with an oxide film made of metal oxides, and thus, the functional groups generated on the resin bonding surface 12 are bonded to the metal oxides on the metal bonding surface 22 of the metal member 20 by van der Waals forces or hydrogen bonds. In addition, by bonding the synthetic resin member 10 and the metal member 20 to each other in a heated and pressurized state, the functional groups of the resin bonding surface 12 form covalent binding with the metal oxide of the metal member 20 by a neutralization reaction (dehydration condensation).

One example of the functional group generated on the resin bonding surface 12 includes at least one of a carboxyl group (—COOH), a carbonyl group (—CO—), or a hydroxy group (—OH) which are generated by the oxidative decomposition of the thermoplastic resin that makes the synthetic resin member 10. When the thermoplastic resin that makes the synthetic resin member 10 is a resin that contains sulfur atoms (heteroatoms), such as polyphenylene sulfide resin (PPS), as the functional group contained in the resin bonding surface 12, in addition to carboxyl groups, carbonyl groups, and hydroxy groups, the functional group containing heteroatoms such as sulfone groups (—SO$_3$H), sulfonyl groups (—SO$_2$—), sulfanyl groups (—SH), and disulfide groups (—SS—) may be contained.

As an example of the neutralization reaction that occurs by bonding the metal member 20 and the synthetic resin member 10 to each other, in a case where the resin bonding surface 12 has a carboxyl group (R—COOH) as a functional group and the metal member 20 is made of a divalent metal, the neutralization reaction occurs as illustrated in Equation (1) below.

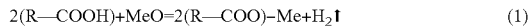

$$2(R\text{—COOH})+MeO=2(R\text{—COO})\text{-Me}+H_2\uparrow \qquad (1)$$

In Equation (1), R is the main chain of the thermoplastic resin that makes the synthetic resin member 10, and Me is the metal that makes the metal member 20.

In a case where the first process is executed in an atmosphere of the oxygen-containing gas, the second temperature T2 is preferably a temperature at which the functional group of the resin bonding surface 12 of the synthetic resin member 10 and the metal oxide formed on the metal bonding surface 22 of the metal member 20 can form the covalent binding by the neutralization reaction. The second temperature T2 is preferably a temperature at which the water generated by the neutralization reaction is removed from the reaction system. Since the second temperature T2 varies depending on the functional group and the type of metal oxide, it is difficult to specify the second temperature T2 in general, but the second temperature T2 is more preferable to be equal to or higher than 100° C. because the water generated by the neutralization reaction is easily removed.

In the second process, the pressure P when the synthetic resin member 10 is pressed against the metal member 20 is preferably a pressure which is equal to or higher than the compressive yield stress of the thermoplastic resin that makes the synthetic resin member 10. Since the pressure P varies depending on the thermoplastic resin that makes the synthetic resin member 10, it is difficult to specify the pressure P in general, but the pressure P is preferable to be 10 to 100 MPa.

In the second process, the moving speed V of the synthetic resin member 10 when the synthetic resin member 10 collides with the metal member 20 is not particularly limited, but may be set to 50 to 150 mm/sec. The time S2 for pressing the synthetic resin member 10 against the metal member 20 is not particularly limited, but may be set to 1 to 10 seconds.

In the present embodiment, a case where the pressing device 53 moves the synthetic resin member 10 toward the metal member 20 is described, but the metal member 20 may be moved toward the synthetic resin member 10.

In the present embodiment, a case where the metal member 20 and the synthetic resin member 10 are bonded to each other locally is described, but the synthetic resin member 10 and the metal member 20 may be bonded to each other over a wide range. The flat surface shape of the bonding location can also be any shape, such as point, line, or surface.

(5) Effect

In order to firmly bond the synthetic resin member 10 and the metal member 20 to each other, it is necessary to bring the thermoplastic resin that makes the synthetic resin member 10 and the metal material that makes the metal member 20 close to each other by approximately several nm, and to make the thermoplastic resin chemically react with the metal material. In the method for manufacturing the metal-resin joint 30 according to the present embodiment, the resin bonding surface 12 of the synthetic resin member 10 is exposed to a gas heated to the first temperature T1 which is equal to or higher than the deflection temperature under load Tf to reduce the viscosity of the thermoplastic resin positioned on the resin bonding surface 12, and then the resin bonding surface 12 and the metal bonding surface 22 are bonded to each other. Therefore, in the present embodiment, even when there is a slight unevenness on the metal bonding surface 22, the resin bonding surface 12 follows the unevenness and deforms, a chemical reaction is likely to occur between the thermoplastic resin and the metal material, and it is possible to firmly bond the synthetic resin member 10 and the metal member 20 to each other.

Moreover, in the present embodiment, it is possible to bond the synthetic resin member 10 and the metal member 20 to each other by locally heating the vicinity of the resin bonding surface 12 without heating the entire synthetic resin member 10 to a high temperature, and thus, the deformation of the synthetic resin member 10 can be suppressed.

In the present embodiment, after the temperature of the resin bonding surface 12 of the synthetic resin member 10 and the metal bonding surface 22 of the metal member 20 is lowered to the second temperature T2, which is lower than the first temperature T1, it is possible to bond the resin bonding surface 12 and the metal bonding surface 22 to each other. In this manner, in a case where the bonding is performed after the temperature is lowered to the second temperature T2, the deformation of the synthetic resin member 10 that occurs when bonding the synthetic resin member 10 to the metal member 20 can be further suppressed.

In the present embodiment, the second temperature T1 can be set to a temperature lower than the melting point Tm of the thermoplastic resin that makes the synthetic resin member 10. In this manner, in a case where the second temperature T2 is a temperature, which is lower than the melting point Tm of the thermoplastic resin, the deformation of the synthetic resin member 10 that occurs when bonding the synthetic resin member 10 to the metal member 20 can be further suppressed.

In the present embodiment, the metal member 20 may be heated in a state where the synthetic resin member 10 and the metal member 20 are disposed to face each other with a gap therebetween. In such a case, it is possible to heat the gas between the synthetic resin member 10 and the metal member 20 to the first temperature T1 by the heat of the metal member 20, and the resin bonding surface 12 can be exposed to the gas heated to the first temperature T1 by a simple configuration. In addition, it is possible to continue performing the second process of bonding the synthetic resin member 10 and the metal member 20 to each other after the first process, and it is possible to manufacture the metal-resin joint 30 in a short time.

In the present embodiment, the heating device 52 may heat the metal member 20 by induction heating. In such a case, it is easier to locally heat a desired position of the metal member 20. In particular, by inductively heating the metal member 20 facing the heating device 52 across the synthetic resin member 10, it is likely to locally heat the vicinity of the metal bonding surface 22 of the metal member 20. Therefore, it is possible to easily control the temperature of the gas, which is in contact with the resin bonding surface 12 of the synthetic resin member 10, and even in a case where it is difficult to perform the bonding by friction bonding or laser welding, similar to a case where the metal member 20 is a hollow-shaped member or a case where the volume of the metal member 20 is large, in the present embodiment, the firmly bonded metal-resin joint 30 can be obtained.

In the present embodiment, after the temperature of the resin bonding surface 12 and the metal bonding surface 22 is lowered to the second temperature T2, which is lower than the first temperature T1, the pressure P when pressing the synthetic resin member 10 against the metal member 20 may be set to a pressure which is equal to or higher than the compressive yield stress of the thermoplastic resin that makes the synthetic resin member 10. In such a case, it is possible to bond the synthetic resin member 10 to the metal member 20 without using a mold, and the tact time (the time from bonding the synthetic resin member 10 and the metal member 20 to each other until practical strength is obtained) can be shortened.

In the present embodiment, the first process may be executed in the oxygen-containing gas. In such a case, the functional groups that can be chemically bound by the neutralization reaction with basic or amphoteric oxides are generated on the resin bonding surface 12 of the synthetic resin member 10. The functional groups generated on the resin bonding surface 12 are bonded to the metal oxide present on the metal bonding surface 22 of the metal member 20 by dipolar interaction, and also form covalent binding with the metal oxide of the metal member 20 by neutralization reaction (dehydration condensation). Therefore, in a case where the first process is executed in the oxygen-containing gas, it is possible to more firmly bond the synthetic resin member 10 and the metal member 20 to each other.

In the present embodiment, a process of roughening the surface of the metal member may be executed. In such a case, by the anchor effect, it is possible to more firmly bond the synthetic resin member 10 and the metal member 20 to each other.

As described in the present embodiment, when the rod 54 that presses the synthetic resin member 10 toward the metal member 20 is inserted through the hollow part of the induction heating coil of the heating device 52 that heats the metal member 20, even in a case where the bonding area between the synthetic resin member 10 and the metal member 20 is small, it is possible to accurately heat and pressurize the bonded part.

In the present embodiment, by reducing the distal end shape of the rod 54 of the pressing device 53, it is possible to reduce the bonding area between the synthetic resin member 10 and the metal member 20, and to simply locally bond the synthetic resin member 10 and the metal member 20 to each other. When the synthetic resin member 10 and the metal member 20 are locally bonded to each other, even when the linear expansion coefficients are different between the synthetic resin member 10 and the metal member 20, the force generated in the metal-resin joint 30 during thermal expansion is unlikely to concentrate on the bonded part, and it is possible to obtain the metal-resin joint 30 having excellent thermal durability. In a case of deliberately peeling off the synthetic resin member 10 from the metal member 20, such as during recycling, by concentrating the force on the local bonded part, the peeling-off can be performed relatively easily. In other words, in the manufacturing method according to the present embodiment, it is possible to simply manufacture the metal-resin joint 30 having excellent thermal durability and recyclability.

Example

In order to specifically show the effects of the above-described embodiments, metal-resin joints (test specimens) of Examples 1 to 16 and Comparative Examples 1 to 8 are prepared.

In Examples 1 to 16, the manufacturing method described in (4) above is carried out in the air to prepare the metal-resin joint. In other words, after the surface of the synthetic resin member is exposed to a gas heated to the first temperature T1, which is equal to or higher than the deflection temperature under load of the thermoplastic resin when a load of 1.8 MPa is applied, by bonding the surface of the synthetic resin member and the surface of the metal member to each other while applying a pressure of 20 MPa at the second temperature T2, the test specimens of Examples 1 to 16 are prepared. In Examples 1 to 16, the types of synthetic resin member and metal member used for bonding, the first temperature T1, and the second temperature T2 are as illustrated in Table 1 and Table 2.

In Comparative Examples 1 to 8, after the surface of the synthetic resin member is exposed to a gas heated to a temperature ta, which is lower than the deflection temperature under load of the thermoplastic resin when a load of 1.8 MPa is applied in the air, by bonding the surface of the synthetic resin member and the surface of the metal member to each other while applying a pressure of 20 MPa at a temperature tb, the test specimens of Comparative Examples 1 to 8 are prepared. The metal member, the synthetic resin member, the temperature ta, and the temperature tb, which are used, are as illustrated in Table 3.

The dimension of the metal member, the dimension of the synthetic resin member, and the bonding area (overlap area)

between the synthetic resin member and the metal member, which are used in Examples 1 to 16 and Comparative Examples 1 to 8, are as follows.

Dimension of metal member: 12 mm×35 mm×1.6 mm
Dimension of synthetic resin member: 12 mm×50 mm×1.5 mm
Bonding area between metal member and synthetic resin member: 10 mm×5 mm The details of the metal members and resin members in Tables 1 to 3 are as follows.

PP resin: Novatec PP (registered trademark) HIG30U
PA66 resin: Leona 1300S
PBT resin: TORAYCON (registered trademark) 1101G-X54
PPS resin: SUSTEEL (registered trademark) SGX120
CFRTP resin: TORELINA (registered trademark) A630T-30V
PEEK resin: VICTREX PEEK 4500 (registered trademark)
Al: A1050 with anodized surface
Fe: SPCC with a surface oxidized and roughened by heating to the melting point of Fe, which is equal to or higher than 1535° C., for one second by laser irradiation
SUS304: SUS304 with a surface oxidized and roughened by heating to the melting point of SUS304, which is equal to or higher than 1450° C., for one second by laser irradiation
Ti: Two types of pure titanium with a surface oxidized and roughened by heating to the melting point of Ti, which is equal to or higher than 1668° C., for one second by laser irradiation With respect to the metal-resin joints of Examples 1 to 16 and Comparative Examples 1 to 8, the bonding strength and the change rate of resin thickness are evaluated. Each evaluation method is as follows.

Bonding strength: In the test method specified in JIS K 6850, the dimension of the metal member, the dimension of the synthetic resin member, and the bonding area between the synthetic resin member and the metal member are changed as described above, and with the other conditions set in accordance with the same standard, the measurement is performed at a tensile speed of 10 mm/min and a measurement temperature of 25° C. using a tensile tester (IMADA SEISAKUSHO CO., LTD., NV301-NA)

Change rate of resin thickness: A thickness th1 of the synthetic resin member before bonding the metal member and a thickness th2 of the synthetic resin member after bonding the metal member are measured, and the change rate ((th1−th2)/th1) of the resin thickness is calculated by dividing the amount of decrease (th1−th2) in thickness of the synthetic resin member by the thickness th1. The thickness th2 of the synthetic resin member after bonding the metal member is a thickness of the synthetic resin member measured at the location where the pressure is applied when bonding the synthetic resin member and the metal member to each other.

The results are illustrated in Table 1 to Table 3.

TABLE 1

|  | Example 1 | Example 2 | Example 3 | Example 4 | Example 5 | Example 6 | Example 7 | Example 8 |
|---|---|---|---|---|---|---|---|---|
| Metal member | Al | Fe | Al | SUS304 | Fe | Al | Al | SUS304 |
| Synthetic resin member | PP | PPS | PPS | PPS | CFRTP | CFRTP | PEEK | PEEK |
| First temperature T1 (° C.) | 600 | 700 | 700 | 700 | 700 | 700 | 700 | 700 |
| Second temperature T2 (° C.) | 270 | 350 | 350 | 350 | 350 | 350 | 350 | 350 |
| Bonding strength (N) | 860 | 1842 | 1466 | 1493 | 1755 | 1509 | 1291 | 1388 |
| Change rate of resin thickness (%) | 50 | 60 | 60 | 60 | 70 | 70 | 70 | 70 |

TABLE 2

|  | Example 9 | Example 10 | Example 11 | Example 12 | Example 13 | Example 14 | Example 15 | Example 16 |
|---|---|---|---|---|---|---|---|---|
| Metal member | SUS304 | SUS304 | SUS304 | SUS304 | Al | Al | Fe | Ti |
| Synthetic resin member | PP | PA66 | PBT | PPS | PP | PPS | PPS | PPS |
| First temperature T1 (° C.) | 160 | 240 | 210 | 230 | 140 | 210 | 250 | 230 |
| Second temperature T2 (° C.) | 155 | 235 | 205 | 225 | 135 | 205 | 240 | 225 |
| Bonding strength (N) | 948 | 1321 | 1242 | 1452 | 1055 | 1472 | 1791 | 1389 |
| Change rate of resin thickness (%) | 99 | 98 | 98 | 99 | 98 | 99 | 99 | 99 |

TABLE 3

|  | Comparative Example | Comparative Example | Comparative Example | Comparative Example | Comparative Example | Comparative Example | Comparative Example | Comparative Example |
|---|---|---|---|---|---|---|---|---|
| Metal member | SUS304 | SUS304 | SUS304 | SUS304 | Al | Al | Fe | Ti |
| Synthetic resin member | PP | PA66 | PBT | PPS | PP | PPS | PPS | PPS |
| First temperature T1 (° C.) | 55 | 65 | 55 | 100 | 55 | 100 | 100 | 100 |
| Second temperature T2 (° C.) | 50 | 60 | 50 | 95 | 50 | 95 | 95 | 95 |

TABLE 3-continued

|  | Comparative Example | Comparative Example | Comparative Example | Comparative Example | Comparative Example | Comparative Example | Comparative Example | Comparative Example |
| --- | --- | --- | --- | --- | --- | --- | --- | --- |
| Bonding strength (N) | 0 | 0 | 0 | 0 | 0 | 0 | 0 | 0 |
| Change rate of resin thickness (%) | 99 | 99 | 100 | 99 | 100 | 100 | 99 | 100 |

As can be seen from the results illustrated in Table 1 to Table 3, in Examples 1 to 16, it is possible to obtain high bonding strength while suppressing deformation of the synthetic resin member. In particular, in Examples 9 to 16, in which the temperature at the time of bonding the resin bonding surface of the synthetic resin member and the metal bonding surface of the metal member is set to a temperature lower than the melting point Tm of the thermoplastic resin that makes the synthetic resin member, it is possible to greatly suppress the deformation of the synthetic resin member while maintaining high bonding strength.

REFERENCE SIGNS LIST 10 synthetic resin member
12 resin bonding surface
20 metal member
22 metal bonding surface
30 metal-resin joint
50 bonding device
51 stage
52 heating device
53 pressing device
54 rod
55 pressurizing unit

The invention claimed is:

1. A method for manufacturing a metal-resin joint in which a synthetic resin member made of thermoplastic resin and a metal member made of metal are bonded to each other, the method comprising:
   a first process of exposing a surface of the synthetic resin member molded into a predetermined shape, to a gas heated to a first temperature higher than a deflection temperature under load, when a load of 1.8 MPa is applied, of the thermoplastic resin; and
   a second process of bonding the surface of the synthetic resin member and a surface of the metal member to each other, wherein
   in the second process, the surface of the synthetic resin member and the surface of the metal member are bonded to each other at a second temperature, which is equal to or higher than the deflection temperature under load, when the load of 1.8 MPa is applied, of the thermoplastic resin and is lower than the first temperature.

2. The method for manufacturing a metal-resin joint according to claim 1, wherein
   in the first process, by heating the metal member in a state where the metal member and the synthetic resin member are disposed to face each other with a gap in the gas, the gas between the metal member and the synthetic resin member is heated to the first temperature by heat of the metal member.

3. The method for manufacturing a metal-resin joint according to claim 2, wherein
   in the first process, the metal member is heated by induction heating.

4. The method for manufacturing a metal-resin joint according to claim 1, further comprising:
   a third process of forming an oxide film on the surface of the metal member, wherein
   in the second process, the oxide film is disposed between the metal member and the synthetic resin member, and the metal member and the synthetic resin member are bonded to each other.

5. The method for manufacturing a metal-resin joint according to claim 4, wherein
   in the third process, a rising temperature per one minute when heating the surface of the metal member is equal to or higher than a melting point temperature of the metal.

6. The method for manufacturing a metal-resin joint according to claim 1, wherein
   the second temperature is a temperature lower than a melting point of the thermoplastic resin.

7. The method for manufacturing a metal-resin joint according to claim 1, wherein
   in the second process, while heating the surface of the synthetic resin member and the surface of the metal member at a second temperature lower than the first temperature, one of the metal member and the synthetic resin member is pressed against the other one at a pressure which is equal to or higher than a compressive yield stress of the thermoplastic resin, and the metal member and the synthetic resin member are bonded to each other.

8. The method for manufacturing a metal-resin joint according to claim 1, wherein
   in the first process, the gas exposed to the surface of the synthetic resin member is an oxygen-containing gas.

9. The method for manufacturing a metal-resin joint according to claim 1, further comprising:
   a fourth process of roughening the surface of the metal member, wherein
   in the second process, the roughened surface of the metal member and the synthetic resin member are bonded to each other.

* * * * *